United States Patent [19]

Anderson et al.

[11] 4,399,933

[45] Aug. 23, 1983

[54] TONER DISPENSING APPARATUS

[75] Inventors: David G. Anderson, Rochester; John J. Bigenwald, Penfield; Joseph Fantuzzo, Webster, all of N.Y.

[73] Assignee: Xerox Corporation, Stamford, Conn.

[21] Appl. No.: 287,322

[22] Filed: Jul. 27, 1981

[51] Int. Cl.$^3$ .............................................. G01F 13/00

[52] U.S. Cl. .................................... 222/407; 222/228; 222/238; 222/414

[58] Field of Search ............... 222/181, 228, 238, 406, 222/407, 414, 199, 201, 202, 311, 312, 313, 623, 216, 217, 225

[56] References Cited

U.S. PATENT DOCUMENTS

| | | | |
|---|---|---|---|
| Re. 27,876 | 1/1974 | Hudson et al. | 222/181 |
| 2,865,536 | 5/1955 | Price | 222/414 X |
| 3,374,768 | 3/1968 | Lawes et al. | 118/637 |
| 3,928,764 | 12/1975 | Bock et al. | 250/272 |
| 4,044,719 | 8/1977 | Ohmori | 118/652 |
| 4,133,458 | 1/1979 | Bundy | 222/228 |
| 4,259,912 | 4/1981 | Stocks et al. | 222/406 X |

FOREIGN PATENT DOCUMENTS

| | | |
|---|---|---|
| 2262773 | 12/1972 | Fed. Rep. of Germany . |
| 50106513 | 5/1973 | Japan . |
| 44112079 | 8/1973 | Japan . |

*Primary Examiner*—Joseph J. Rolla
*Assistant Examiner*—Russell D. Stormer

[57] ABSTRACT

Toner dispensing apparatus comprising a toner hopper the walls of which form an elongated opening from which toner is capable of being dispensed and a dispensing roll to dispense toner from the hopper through the elongated opening into the developer chamber. The dispensing roll is a cylindrical resiliently deformable foam roll having a plurality of depressions of predetermined size, shape and volume uniformly disposed on the roll and being capable of holding finely divided toner. The deformable foam roll including the depressions has a thin toner impermeable surface. In a preferred embodiment, the depressions are a plurality of longitudinal surface grooves parallel to the axis of the roll and uniformly spaced around the circumference of the roll. The roll is positioned relative to top and bottom lobe members in the toner hopper such that it provides a seal between the toner hopper and the developer chamber. The lobes also provide a way for expelling toner from the deformable foam roll into the developer chamber as the roll rotates from the toner hopper past the lobe members into the elongated opening. In a specific embodiment the toner impermeable surface and the foam are formed of the same materials, the impermeable surface being formed as the continuous skin of the foam.

13 Claims, 6 Drawing Figures

TONER DISPENSING APPARATUS

REFERENCE TO RELATED APPLICATION

Reference is hereby made to copending application Ser. No. 287,461 filed concurrently herewith and entitled Toner Dispensing Apparatus in the name of Joseph Fantuzzo and Karen Capazzi-Gooding.

BACKGROUND OF THE INVENTION

The present invention is directed to toner dispensing apparatus. More specifically, the present invention is directed to toner dispensing apparatus for a developer station in an automatic electrostatographic machine. In particular, the invention is specifically directed to the use of a novel toner dispensing roll.

In the act of xerography a photoconductive insulating plate supported by conductive backing is first uniformly charged, and then exposed to a light and shadow image of an image to be reproduced. Under the influence of the light image the photoconductive layer becomes conductive and the charge is selectively dissipated in the light image areas through the photoconductive plate to the conductive backing leaving an electrostatic latent image on the photoconductive plate. The electrostatic latent image which is not visible to the eye is made visible by contacting the photoconductive plate bearing the image with a finely divided pigmented resin base material commonly referred to in the art as toner which is first charged to a potential opposite that of the electrostatic latent image. The toner will adhere to the photoconductive plate in the image or charged areas. Typically the developer is transferred from the photoconductive plate to a final support material such as paper and fixed such as by heat fusing thereto to form a permanent record of the original. The toners employed in this practice are finely divided resin based materials which have an average particle size of about 10 microns. To place a charge on the individual toner particles, the toner is brought in contact with a relatively coarse carrier material which is remote from the carrier in the triboelectric series. During the rubbing and mixing action between the toner and carrier particles, the toner particles become triboelectrically charged to a polarity opposite that of the carrier. Further, the charged toner particles electrostatically coat themselves on the surface of the coarser carrier material and remain bonded thereto in a charged state. To develop an electrostatic latent image this two component material is brought into contact with the photoconductive plate and the toner is electrostatically transferred from the carrier surface to the electrostatic latent image. Thus, the coarser carrier particles not only provide a means for charging the toner particles, but also provide the transporation of the toner particles from one part of the apparatus to the other.

In an automatic reproducing device, the toner material is consumed in the development process and it must be periodically replaced within the development system in order to sustain continuous operation of the machine. Various techniques have been used in the past to replenish the toner supply. Initially new toner material was added directly from supply bottles or containers to the dispensing apparatus by pouring. However, the addition of such gross amounts of toner material altered the triboelectric relationship between the toner and the carrier resulting in reduced charging efficiency of the individual toner particles which accordingly resulted in a reduction in the development efficiency when the developer contacted the latent image bearing surface. Furthermore, the pouring process was both wasteful and dirty in that some of the toner particles became airborne and would tend to migrate into the surrounding area and other parts of the machine. The need to maintain the developer ratio between carrier and toner relatively constant and the need to maintain comparatively uniform triboelectric properties is even more pronounced with the more automatic faster xerographic processing equipment available today. Attempts have been made to provide a separate toner hoper with a dispensing mechanism for adding the toner from the hopper to the developer apparatus in the automatic xerographic reproducing machines on a regular or as needed basis.

PRIOR ART

U.S. Patent Reissue No. 27,876 to Hudson et al describes a toner dispensing device for an electrostatographic machine wherein a closed container having an opening at the bottom, is sealed off from the rest of the machine by a resilient open celled elastomeric roll which is rotatably supported in biasing contact with the walls of the opening to retain particulate toner material within the open cells. The roll is sequentially rotated through the toner supply position in the container, wherein the open celled cavities on the roll are uniformly loaded with particulate material and then passed at least one biasing wall where the roll surface is deformed sufficiently to force the particulate material from the roll surface into the developer chamber.

U.S. Pat. No. 3,374,768 to Lawes et al describes a developing device wherein a hard roller with an anodized aluminum surface having a regularly arranged array of recesses of predetermined shape, size and volume on the surface is loaded with toner material followed by scrapping the surface with a doctor blade to remove excess powder. The toner is removed from the roller with a plurality of brush bristles moving in the same direction as the roller so as to pick up powder out of the recesses.

U.S. Pat. No. 4,133,458 to Bundy describes a toner dispenser arrangement with an open cell foamed elastomeric material having a textured outer surface to receive and support toner particles. The dispensing roll is rotated within the toner hopper to load the open celled cavities and then passed at least one of the biasing surfaces where the roll is deformed to cause the toner to be dispensed to the developer chamber. The device is provided with an antibriding web like means to ensure the contents of the container remain in the particulate state and to ensure uniform dispensing.

West German Offenlegungsschrift No. 2262773 to Fujimoto describes a toner feeding apparatus with a solid dispensing roll having a plurality of axial grooves on its surface parallel to the axis of the roll and having a saw tooth shaped pattern around the circumference of the roll which may be loaded with toner material. The roll may be rotated from a toner loading position to a discharge position and the toner removed from the roll by a toner stripping device.

The toner dispensing mechanism illustrated by Hudson et al, U.S. Reissue No. 27,876 has been widely used. With such an open celled foam dispensing roll, the toner is loaded into the cells during that portion of the foam rolls travel in the toner hopper. As the foam roll is rotated past the two sets of lobes, the toner is retained under pressure within the open cells of the foam roll. As the foam roll is rotated past the exit lobe the release of the pressure on the open cells provide a spring thrust to the toner within the cells so that a force in addition to that of gravity expels the toner out of the cells into the developer chamber.

While this technique is generally satisfactory, it suffers from certain drawbacks. With continued use and particularly with long term use, the open celled foam roll gradually becomes impregnated with toner often times with the toner impregnation extending all the way to the foam roll shaft. As the foam roll becomes increasingly impregnated, several things happen to the operational properties under which the foam dispensing roll operates. Initially, as the toner impregnation commences the foam tends to loose flexibility or resiliency and therefore lacks that extra kick to expell toner from the open cells of the foam to the developer chamber. The toner not expelled from the cells contributes to the further buildup or impaction of toner in the open cells of the foam roll. This gradual buildup also contributes to non-uniform and generally decreasing toner dispensing rates until it reaches a point where the foam roll is fully impregnated with toner and the dispensing rate falls off drastically leading to nonuniform image density from copy to copy. In addition, as the degree of toner impregnation or compaction of the foam roll increases, the outside diameter of the foam roll decreases to a point where the seal between the roll and the hopper lobes is lost and undesirable large amounts of toner may pass to the developer chamber. Furthermore, as the foam roll becomes impregnated with toner the torque required to drive the roll increases, increasing the load on the motor driving the shaft and/or increasing the load on the shaft. In this instance it is possible for the shaft to fracture or separate from the foam and/or the motor to burn out. In each of the above instances, the operational life of the dispensing roll is substantially reduced and it must be replaced at unscheduled times giving rise to increased service cost for the reproducing machine user.

The device described in the German application includes the use of a solid or firm rather than flexible roll and thereby cannot establish either the seal between the roll and the top and bottom lobes or the kicking action of the compressed resiliently flexible foam to expel the toner particles from the recesses of the roll with force as the roll leaves the bottom lobe in the developer housing.

SUMMARY OF THE INVENTION

It is an object of the present invention to provide a novel toner dispensing apparatus.

It is a further object of the invention to provide a toner dispensing roll with a long life of uniform toner dispensing capability.

It is a further object of the present invention to provide a toner dispensing roll which does not become impregnated and compacted with toner particles.

It is a further object of the present invention to provide a toner dispensing roll which requires a relatively constant drive torque over time.

It is a further object of the present invention to provide an improved dispensing roll seal between toner hopper and developer chamber.

It is a further object of the present invention to provide a relatively clean toner container and dispenser.

These and other objects are attained with a toner dispensing apparatus comprising a toner hopper for containing a quantity of finely dividied toner, said hopper having an elongated opening formed by the cooperation of the hopper walls through which toner is capable of being dispensed, and a dispensing roll to dispense toner from the hopper through the elongated opening of the hopper. The dispensing roll comprises a generally cylindrical resiliently deformable foam roll having a plurality of toner holding depressions of predetermined size, shape and volume uniformly disposed on the roll surface. The resilient deformable foam roll including the depressions has a thin toner impermeable surface thereon. In a preferred embodiment the plurality of depressions in the dispensing roll comprises a plurality of longitudinal surface grooves parallel to the axis of the dispensing roll and uniformly spaced around the circumference of the toner dispensing roll. The toner dispensing roll is rotatably positioned in toner supply communication with the toner hopper and in toner discharge communication with the developer chamber and is positioned between top and bottom lobe members which extend into the deformable foam and which serve to provide a seal between the toner hopper and the developer chamber as well as providing a means for expelling toner from the resiliently deformable foam roll into the developer chamber as the foam roll rotates from the toner hopper past the top and bottom lobe members into the developer chamber.

For a better understanding of the present invention as well as other objects and further features thereof, reference is had to the following description of the invention to be read in conjunction with the accompanying drawings wherein:

DESCRIPTION OF PREFERRED EMBODIMENT

The invention will now be described by reference to a preferred embodiment of the reproducing apparatus.

Figure 1:
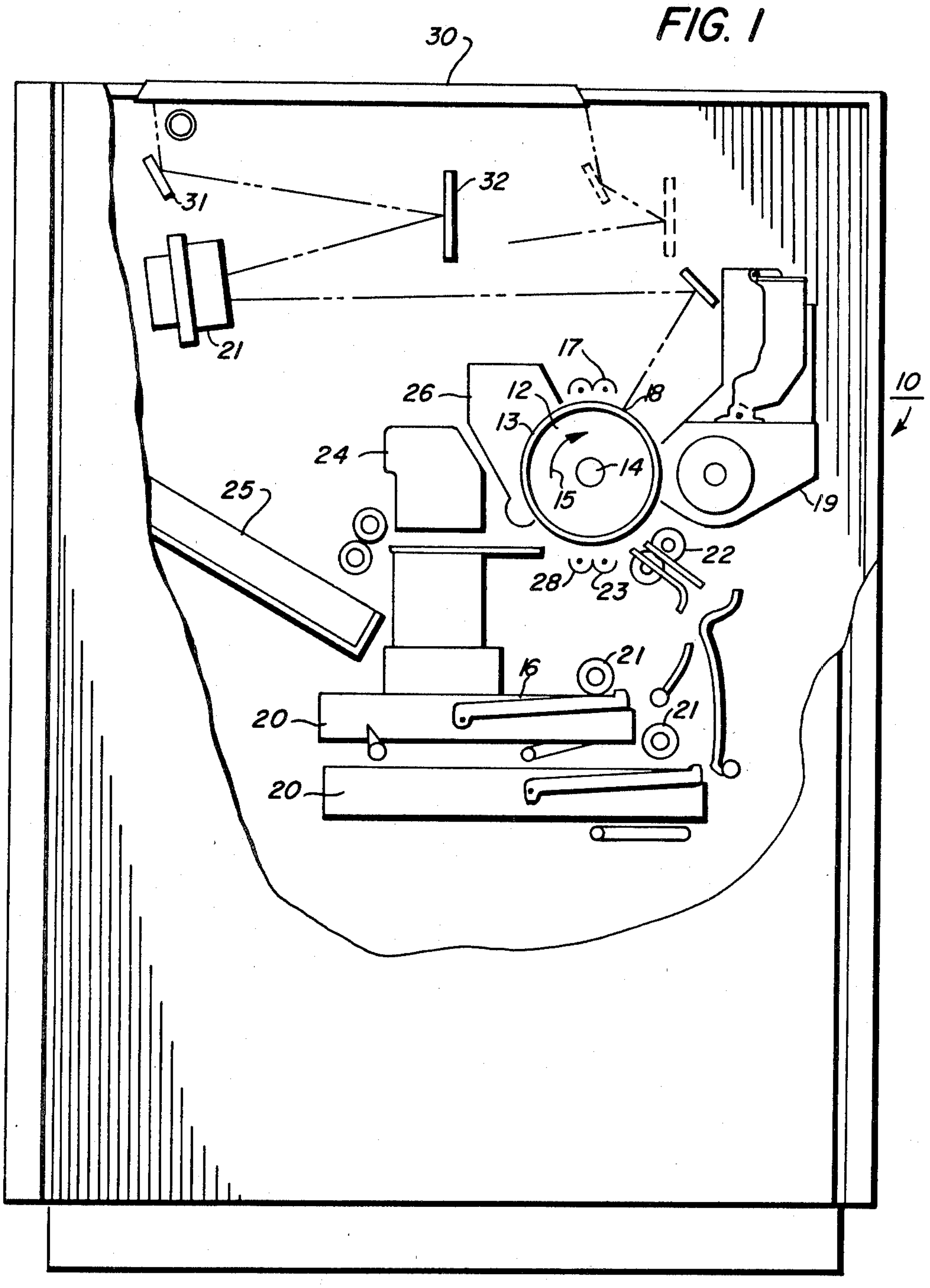
FIG. 1 is a schematic representation of an automatic xerographic reproducing apparatus using the toner dispensing apparatus of the present invention.

Referring now to FIG. 1 there is shown by way of example an automatic xerographic reproducing machine 10 which includes the toner dispensing apparatus of the present invention. The reproducing machine 10 depicted in FIG. 1 illustrates the various components utilized therein for producing copies from an original document. Although the apparatus of the present invention is particularly well adapted for use in an automatic xerographic reproducing machine 10, it should become evident from the following description that it is equally well suited for use in a wide variety of processing systems including other electrostatographic systems and it is not necessarily limited in application to the particular embodiment or embodiments shown herein.

The reproducing machine 10, illustrated in FIG. 1 employs an image recording drum-like member 12, the outer periphery of which is coated with a suitable photoconductive material 13. The drum 12 is suitably journaled for rotation within a machine frame (not shown) by means of shaft 14 and rotates in the direction indicated by arrow 15 to bring the image-bearing surface 13 thereon past a plurality of xerographic processing stations. Suitable drive means (not shown) are provided to power and coordinate the motion of the various cooperating machine components whereby a faithful reproduction of the original input scene information is recorded upon a sheet of final support material 16 such as paper or the like.

Initially, the drum 12 moves the photoconductive surface 13 through a charging station 17 where an electrostatic charge is placed uniformly over the photoconductive surface 13 is known manner preparatory to imaging. Thereafter, the drum 12 is rotated to exposure station 18 wherein the charged photoconductive surface 13 is exposed to a light image of the original input scene information whereby the charge is selectively dissipated in the light exposed regions to record the original input scene in the form of an electrostatic latent image. After exposure drum 12 rotates the electrostatic latent image recorded on the photoconductive surface 13 to development station 19 wherein a conventional developer mix is applied to the photoconductive surface 13 of the drum 12 rendering the latent image visible.

Sheets 16 of the final support material are supported in a stack arrangement on elevating stack support trays 20. With the stack at its elevated position a sheet separator 21 feeds individual sheets therefrom to the registration system 22. The sheet is then forwarded to the transfer station 23 in proper registration with the image on the drum. The developed image on the photoconductive surface 13 is brought into contact with the sheet 16 of final support material within the transfer station 23 and the toner image is transferred from the photoconductive surface 13 to the contacting side of the final support sheet 16. Following transfer of the image the final support material which may be paper, plastic, etc., as desired is transported through detack station where detack corotron 28 uniformly charges the support material to separate it from the drum 12.

After the toner image has been transferred to the sheet of final support material 16, the sheet with the image thereon is advanced to a suitable fuser 24 which coalesces the transferred powder image thereto. After the fusing process the sheet 16 is advanced to a suitable output device such as tray 25.

Although a preponderance of toner powder is transferred to the final support material 16, invariably some residual toner remains on the photoconductive surface 13 after the transfer of the toner powder image to the final support material. The residual toner particles remaining on the photoconductive surface 13 after the transfer operation are removed from the drum 12 as it moves through a cleaning station 26. The toner particles may be mechanically cleaned from the photoconductive surface 13 by any conventional means as, for example, by the use of a cleaning blade.

Normally, when the copier is operated in a conventional mode, the original document to be reproduced is placed image side down upon a horizontal transparent viewing platen 30 and the stationary original then scanned by means of a moving optical system. The scanning system fundamentally consists of a stationary lens system 21 positioned below the right hand margin of the platen as viewed in FIG. 1 and a pair of cooperating movable scanning mirrors 31, 32 which are carried upon carriages not illustrated.

It is believed that the foregoing general description is sufficient for purposes of the present application to illustrate the general operation of an automatic xerographic copier 10 which can embody the apparatus in accordance with the present invention.

Referring now particularly to FIGS. 2–6 the developing apparatus including the toner dispenser of the present invention will be described in greater detail. The developing station 19 includes a developer chamber 40 housing the developer mechanism; a developer cross mixer 41 and a toner dispenser 42. Typically, the developer mechanism could include a magnetic brush development roll 43 which is rotatably driven by means not shown about shaft 44. In such a system, a developer mix having coarse ferromagnetic carrier granules and toner colorant particles could be used. The magnetic brush developer roll is in developing engagement with the photoconductive drum 12 carrying the electrostatic latent image. The developer cross mixer 41 ensures that the toner and carrier in the developer are more uniformly mixed and present a more uniform mixture to the electrostatic latent image to be developed.

Figure 2:
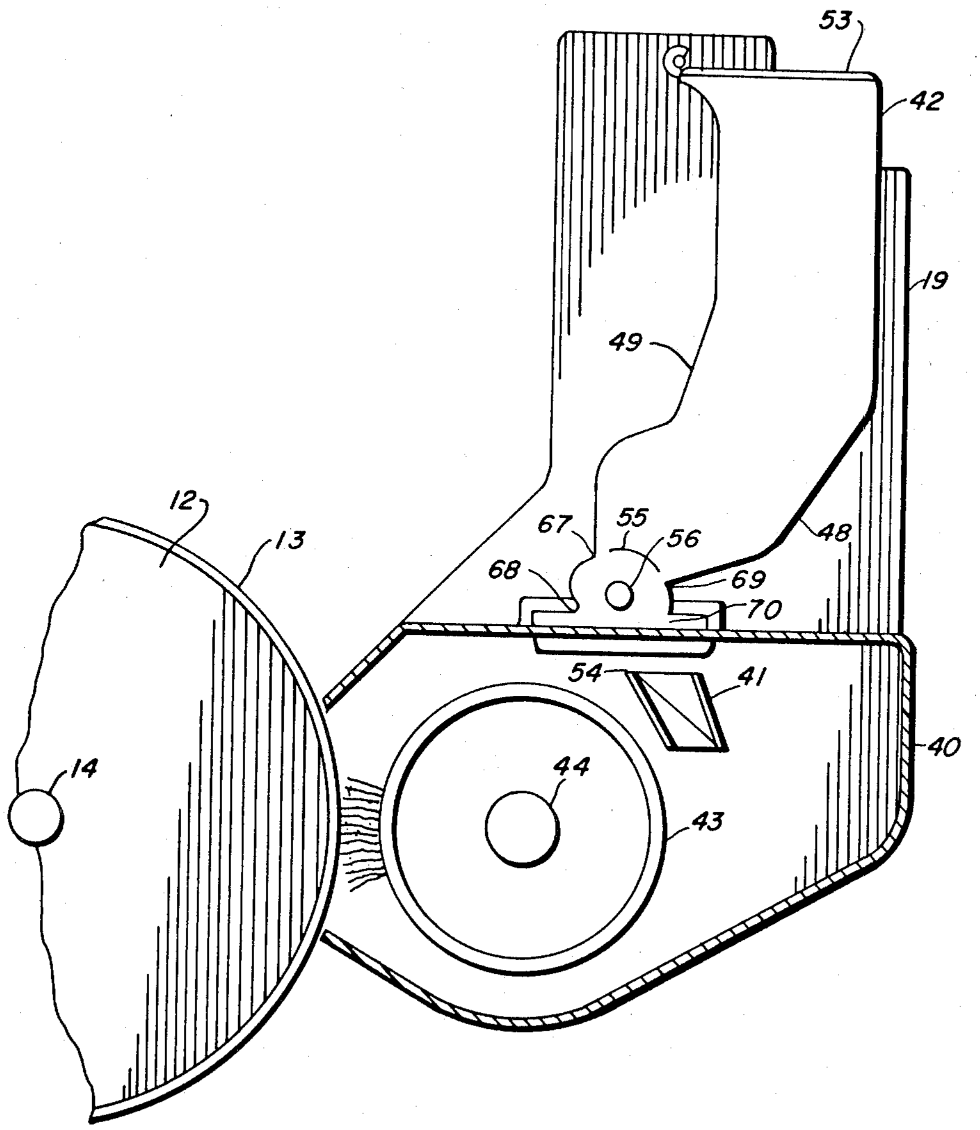
FIG. 2 is an enlarged schematic cross sectional view showing the developer assembly and the toner dispenser of the present invention.
Figure 3:
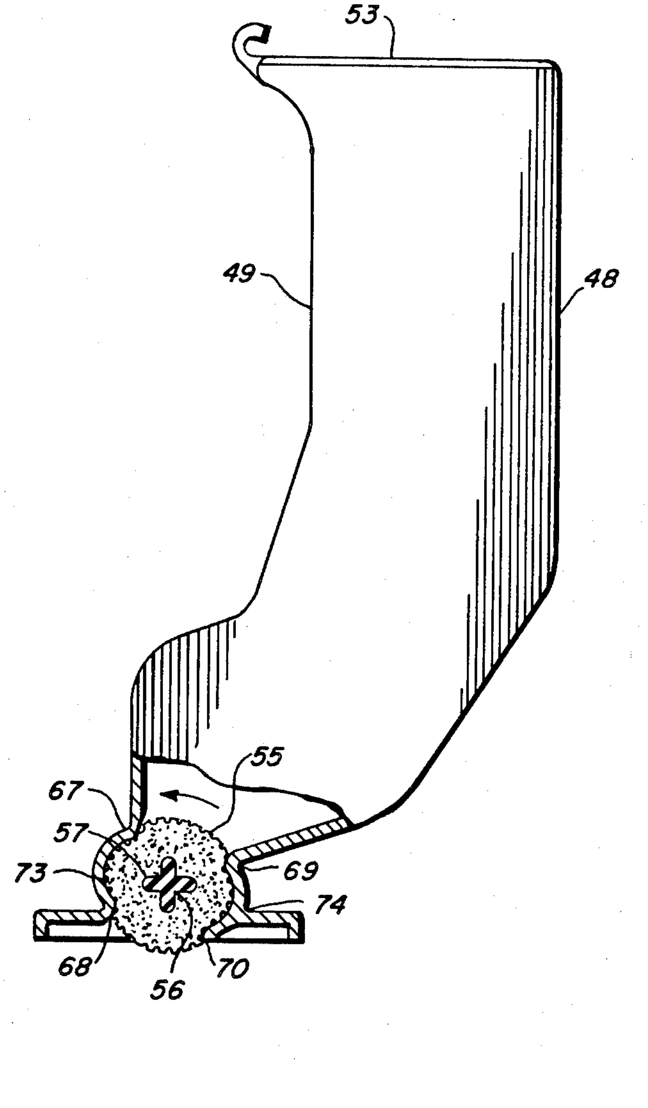
FIG. 3 is an enlarged schematic cross sectional view showing the toner dispenser of the present invention.
Figure 6:
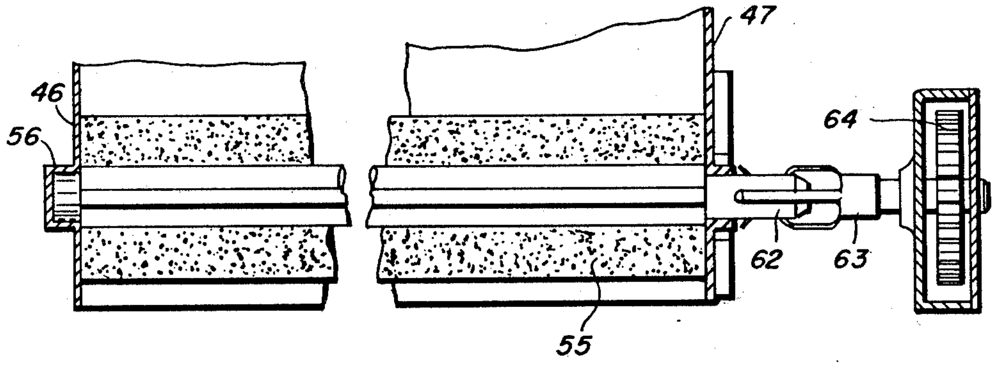
FIG. 6 is an end view showing the dispensing roll mounted in the bottom of the toner hopper.

As illustrated in FIGS. 2, 3 and 6, the toner dispenser includes a hopper 42 constructed of two substantially parallel end walls 46 and 47 and two side walls 48, 49 that are integrally connected at their corners to form an enclosed recepticle. The top of the hopper 42 is provided with an opening covered by a lid 53 through which new toner material may be added directly to the toner dispenser to replenish the supply in the developer housing. The bottom portions of the two sidewalls 48,49 cooperate with the end walls 46, 47 to form an elongated opening 54 in the bottom of the container. The inclined surface of the side wall 48 and the substantially vertical surface of the side wall 49 function to direct particulate material supported within the container downwardly toward the elongated opening 54. Preferably the container is formed of a blow molded thermoplastic material which is relatively rigid at room temperature. Typical resin based material from which this type of container may be molded are polyethylenes, polyproplyenes, chlorinated polyethers, acrylonitrile butadiene styrene, polystyrene, acetates, fluorocarbons and methyl acrylate. Care should be taken however to select the thermoplastic resin from a group of thermoplastic materials which are chemically inert with respect to the composition of the particulate toner material contained therein.

The toner dispenser 42 includes dispensing roll 55 adapted to support a quantity of particulate material therein which is mounted within the container on shaft 56 so that the roll is adjacent the elongated opening 54. Further details of the roll may be had by reference to FIGS. 3–6 wherein it may be seen that the dispensing roll 55 comprises a shaft 56 with four small vanes 57 equally spaced around the circumference of the shaft to give structural integrity to the resiliently deformable foam material of which the roll is made. The foam roll 55 is securely fixed to the shaft by any suitable means. Typically the foam is integrally bonded to the shaft during the foaming process as will be more completely described hereafter. The surface of the foam roll has a plurality of depressions 60 of predetermined size, shape and volume which are uniformly dispersed about the roll surface. The volume of these depressions may be determined for any given development configuration or development requirements. Basically the size, shape and volume of these depressions are determined by the degree to which toner must be replenished in the developer chamber. The surface of the roll 55 including the surface of the depressions is covered by a continuous toner impermeable surface 61 or skin to prevent the finely divided toner from entering the main body of the foam, compacting the foam and causing the difficulties described heretofore with respect to the toner dispensing roll of U.S. Pat. Reissue No. 27,876.

Figure 4:
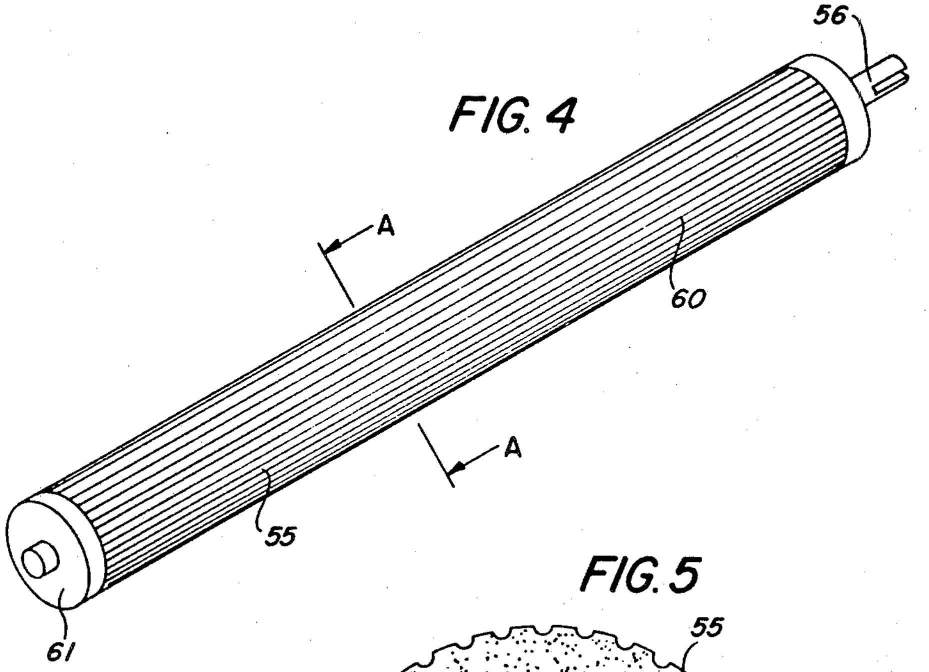
FIG. 4 is an isometric view of the toner dispensing roll according to the present invention.
Figure 5:
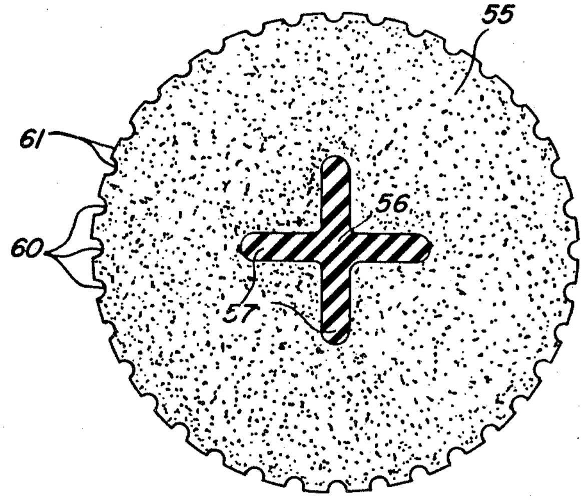
FIG. 5 is a cross sectional view of the toner dispensing roll shown in FIG. 4 taken along line A—A.

While the depressions on the surface of the foam may be of any suitable configuration such as small pockets or holes, a particularly preferred configuration is that with longitudinal grooves parallel to the axis of the roll illustrated in FIGS. 4, 5 and 6. These grooves are uniformly spaced around the circumference of the roll and are covered by a continuous toner impermeable surface or skin 61 to prevent the toner from penetrating into the foam. FIG. 5 illustrates in cross section one such dispensing roll wherein a plurality of grooves 60 are formed in and uniformly spaced about the circumference of the foam roll 55 which is supported about roll shaft 56 and roll support vanes 57. In operation as may be more readily seen with reference to FIG. 6, the toner dispensing roll 55 is mounted at one end in end wall 46 through shaft 56 and at the opposite end is mounted in the end wall 47 with the spline of the shaft 62 connected through motor spline shaft 63 to gear 64 which is driven by a motor (not shown). As the motor drives the toner dispensing roll toner is deposited in the grooves of the dispensing roll in the toner hopper or toner loading position and the roll rotates to the toner dispensing position where the toner is discharged into the developer housing.

In a particularly preferred embodiment a thirteen inch length roll about one inch in diameter has 36 "U" shaped grooves in its surface uniformly spaced about 10 degrees around the circumference of the roll. Each of the grooves is about 0.060 inches wide and about 0.015 inches in depth and delivers about 1.9 grams of toner per revolution from the toner hopper to the developer chamber. The grooves may have any suitable cross sectional shape. For example, "U" shaped or square shaped grooves can be used. "U" shaped grooves are preferred since all sides are gently covered or rounded with no sharp corners where small toner particles could possibly get trapped.

The foam from which the dispensing roll is made may be either an open or closed cell foam since both surfaces are protected by a continuous surface coating or skin so the finely divided toner can not impregnate and impact the foam material. Open celled foam is slightly preferred since closed cell foams have a tendency with prolonged use to take a small compression set which will alter the sealing properties of the foam.

The toner dispensing roll can be formed from any suitable foamed elastomeric material. Typical examples of materials which can be foamed into suitable rolls include; polyurethanes, polyvinylchloride, siliçones, polystyrenes, styrene acrylontrile, cellulose acetate and phenolics. In the preferred embodiment of the present invention a typical roll is fabricated from a urethane foam such as F-0071A isocyanate and F-0410B polyol which are mixed together, both of which are available from WITCO Chemical Corporation, 277A Park Avenue, New York, New York. These are foams which are cellular materials formed by the reaction of a polyol and an isocyanate generally in the presence of a catalyst. The two materials react rapidly in the presence of tertiary amines in combination with stannous or other metallic salts to produce a material which is relatively strong and resilient at room temperature. The term resiliency is used herein to describe the property of a material which has been deformed to rapidly recover its original posture after the force of deformation is removed. The foam may be formed on a shaft of any suitable material. Typical resin base materials which can be used for this purpose and about which the foam can be molded include, polypropylenes, polyethylenes, chlorinated polyethers, acrylonitrile butadiene styrene, polystyrene, acetates, fluorocarbons and methylmethacrylate. A preferred material includes acrylonitrile butadiene styrene with 20% glass filled fibers. This shaft has the capability of being bent for ready insertion into the toner dispenser. For example, one end of the shaft may be placed directly in the hole mounting in the toner dispenser, the roll bent slightly while the other end is placed in position in cooperation with the drive mechanism.

While the toner dispenser roll according to the present invention may be made in any suitable manner, it is preferred that the roll be manufactured through a molding process. In a typical molding process a two piece mold is used in which both halves of the mold are coated as by spraying with a suitable mold release material such as a wax or fluorocarbon followed by adding premeasured amounts of the foam material to the mold halves and joining them. In this manner the roll formed can have a continuous surface of the foam which is integrally formed of the same material as the foam core. In this molding technique the foam material is self skinning thereby forming the toner impermeable surface on the foam roll including the depressions. While this fabricating technique has the beauty of simplicity and while it can be used to produce satisfactory rolls, difficulties are sometimes encountered in controlling the thickness and uniformity of the surface skin or shell since the skin thickness is a function of the temperature differential between the mold and the foam material. With a small differential a thin surface skin integrally bonded to the foam core is produced which has a tendency to wear or flake off which may give rise to the toner impregnation problems discussed with regard to U.S. Pat. Reissue No. 27,876.

The preferred roll fabricating technique which tends to minimize these difficulties includes forming a separate surface layer that is bonded to the foam core. Any suitable material may be used to provide the surface coating or skin on the toner dispenser roll. Typically, a skin is selected from those elastomeric material which are capable of forming non-permeable surface coatings on foam materials. A particularly preferred example are the urethane films which provide long wearing qualities to the dispenser roll. Specifically, a film available from Allerton Chemical Division of Voplex Corporation, Rochester, New York under the designation 780-20858, forms a very desirable skin. It is important that the skin be durable and not be capable of being penetrated by the finely divided toner particles as this provides the increased operational life of the toner dispenser. In this regard it is particularly significant that the skin contain no pores or holes or other coating discontinuities but rather provide a smooth uniform continuous toner impermeable coating to the foam roll.

In a preferred molding process, a two piece mold is used in which both halves of the mold are coated as by spraying with a suitable mold release material followed by coating both halves of the mold with a suitable elastomeric coating such as a polyurethane film. Immediately after coating both halves of the mold with the elastomeric surface forming material, the foam material should be added to form a good adhesive bond between the skin and the foam. With the use of the preferred polyurethane materials premeasured amounts of a polyol and an isocyanate already premixed may be poured into both halves of the mold after which the mold is closed and the foam allowed to form insitu. Typically for polyurethane elastomeric coating films and foam materials a cure time of about 10 minutes at slightly elevated temperatures of around 110° F. and atmospheric pressure is suitable in forming the dispenser roll. In the above described process, it is important that one step be accomplished immediately after the immediately preceding step so that the bond between the foam material and the surface forming skin material is as good as possible. This increases the structural integrity between the surface film and the main body of the foam and thereby the life time reliability of the foam roll. In addition, since the surface film is an elastomer it springs back rapidly when deformed and helps keep the depressions in their normal configuration.

It should be understood that both molding techniques herein disclosed may use the same materials to produce the foam roll. In the first mentioned technique the foam material is self skinning producing its own surface skin while in the second technique, a separate elastomeric layer is bonded to the foam core of the roll. The urethane foam materials previously mentioned may be used in either molding technique.

With continued reference to FIGS. 2 and 3, formed as a dependent part of each of the container sidewalls are two sets of elongated bosses or lobes 67, 68, 69, 70 extending horizontally across the width of the container in substantially parallel relationship. The upper lobes 67 and 69 are positioned in the interior of the toner dispenser while the two lower lobes 68 and 70 are positioned adjacent the toner discharge opening. These lobes extend outwardly from the inner wall surfaces to depress or mechanically bias the curved surface of the resilient roll 55. In addition, the two parallel ends of roll 55 are biased into contact with the interior flat surface of end walls 46, 47 so that the entire periphery of the roll is in contact with the entire surface of the container. Sufficient pressure is maintained between the roll and the interior of the container to prevent unwanted toner from passing therebetween. In effect, the resiliently deformable roll functions to form a movable seal capable of retaining toner material within the container. The primary function of the toner dispenser roll is to deliver a substantially uniform and even quantity of particulate material across the elongated toner dispensing opening. The individual depressions on the roll become loaded with toner particles as the roll rotates through the finely divided toner. The individual depressions fill themselves in a scoop-like manner as they are moved through the toner supply. Since the depressions are substantially the same size each depression is capable of loading itself with approximately the same amount of material. Furthermore, since the depressions are uniformly spaced around the circumference of the roll, the material is evenly distributed across the surface of the roll. In effect the resiliently deformable elastomeric roll described herein is not only a self loading device, but also has the capability of storing and holding a uniformly distributed load across length of the surface member.

After moving through the supply of particulate material in the toner hopper, the toner ladened roll moves sequentially past upper lobe 67, the curved section 73 of side wall 49, and lower lobe 68 before passing into elongated opening 54. As previously noted, the upper lobe 67 extends a substantial distance into the cylindrical resiliently deformable foam roll to form a seal and prevent the supply of material in the container from escaping. However, the mechanical biasing pressure is insufficient to destroy the rolls unique loading and holding properties. Although some toner may be dislodged as the deformed roll surface is moved past the protruding lobe, the amount of toner removed is equally distributed across the roll surface so that the uniformity of loading is relatively undisturbed. After moving past lobe 67, the resilient roll recovers slightly and comes in sliding contact with the interior surface of arcuate wall section 73. The curved wall surface acts to constrain the roll surface to further support the toner particles within the cavities as the roll is forwarded toward the dispensing opening.

It has been found that two distinct mechanism used alone or in combination can be employed to remove particulate material from the surface of the resiliently deformable roll. The first method is to deform the resilient roll surface just prior to its entering the dispensing opening so that further rotation of the roll causes the roll surface to spring back to its original posture as it passes into the opening. It should be understood that the roll is sufficiently deformed so that the toner on the roll surface is mechanically thrown into the opening as the roll recovers. Secondly, the particulate material can also be mechanically pushed from the roll surface by means of a stationary compressing member or the like placed in interference with the roll surface. As the roll moves toward the stationary compressing member, the surface of the roll is deformed to enlarge the depressions. Further movement of the roll into the member causes the granular material to be pushed or forced from the surface of the roll.

In the present invention both methods of removing toner materials from the roll surface are employed. However it should be quite clear that either of these methods could be used alone or in any combination thereof to dispense material from the roll surface without departing from the teachings of the present invention. Referring once again to FIG. 3, two lobes 68 and 70 which protrude into the path of movement of the roll surface, are located on the side walls of the container adjacent to the elongated opening 54. As the roll is rotated in the direction indicated, the left hand lobe 68 extends a substantial distance into the cylindrical resiliently deformable foam roll and acts to compress the roll prior to its entrance into opening 54. Toner materials supported by the surface depressions are mechanically thrown from the roll surface as the resilient roll moving into the opening springs back to its original shape. Further rotation of the roll to the opening brings the roll surface into biasing contact with a second lobe 70 associated with the side wall 48 of the container. The second protruding lobe pushes against the upwardly moving roll surface to scrape or push any toner material from the roll which may still be remaining thereon from the depressions. By using this two-step toner removal technique, complete and thorough toner dispensing is accomplished within the dispensing opening.

While this invention has been described with reference to the structure disclosed herein, it is not confined to the details set forth in this application but is intended to cover modifications and changes as may become apparent to the artisan. For example, while the toner dispensing roll has been described as being positioned in the bottom of the toner hopper, it may be positioned such as to dipense the toner sidewardly through the side wall of the toner hopper. Furthermore, while the depressions on the toner dispenser roll have been described as being longitudinal grooves, it is altogether possible to use other geometric shapes such as a golf ball type pattern which is uniformly distributed over the surface of the toner dispenser. It is intended that these and other modifications would come within the scope of the appended claims.

We claim:

1. A toner dispensing apparatus comprising a toner hopper for containing a quantity of finely divided toner, said hopper having an elongated opening formed by the cooperation of the walls thereof through which toner is capable of being dispensed from said hopper, and a dispensing roll to dispense toner from said hopper through said elongated opening of said hopper, said dispensing roll comprising a generally cylindrical resiliently deformable foam roll having a plurality of depressions of predetermined size, shape and volume uniformly disposed on the roll surface, said depressions being capable of holding therein toner to be transported, said resilient deformable foam roll including said depressions having a thin toner impermeable surface thereon formed of the same material and as the continuous skin of the foam.

2. The toner dispensing apparatus of claim 1 wherein said plurality of depressions in said dispensing roll comprises a plurality of longitudinal surface grooves parallel to the axis of the dispensing roll and uniformly spaced around the circumference of the toner dispensing roll.

3. The toner dispensing apparatus of claim 2 wherein said longitudinal grooves are "U" shaped in cross-section.

4. The toner dispensing apparatus of claim 2 wherein said toner impermeable surface and said foam roll of said dispensing roll are formed of the same material, the impermeable surface being formed as the continuous skin of the foam.

5. The toner dispensing apparatus of claim 1 wherein said dispensing roll is an open cell foam roll molded on a support shaft with the plurality of depressions and the toner impermeable surface molded onto the open cell foam.

6. The toner dispensing apparatus of claim 1 wherein said dispensing roll is a closed cell foam roll molded on a support shaft with the plurality of depressions and the toner impermeable surface molded onto the closed cell foam.

7. The toner dispensing apparatus of claim 1 including means to rotate said dispensing roll and means to meter a uniform load of toner on said dispensing roll as it rotates from the toner hopper.

8. The toner dispensing apparatus of claim 1 wherein said elongated opening is formed by the cooperation of the side walls and end walls of the hopper and said elongated opening is in the lower portion of said hopper which together with said roll form a toner loading station.

9. The toner dispensing apparatus of claim 7 wherein said side walls extend downwardly terminating in top lobe members which extend a substantial distance into said cylindrical resiliently deformable foam roll to expand the plurality of surface depressions exposed to the elongated opening to permit toner to be loaded onto the foam roll when exposed to the toner hopper.

10. The toner dispensing apparatus of claim 9 wherein said cylindrical resiliently deformable foam roll forms a seal with the lobe members of said side walls to thereby prohibit undesired escape of toner from said hopper.

11. The toner dispensing apparatus of claim 10 including supplemental lobe members spaced below said first mentioned lobe members which together with said foam roll forms a toner discharge station, said supplemental lobe members extending a substantial distance into said cylindrical resiliently deformable foam roll at said discharge station whereby the depressions in said foam roll are expanded to permit toner to be discharged therefrom.

12. The toner dispensing apparatus of claim 11 including arcuate side walls positioned between associated top lobe members and supplemental lobe members on both sides of said foam roll, said arcuate side walls forming an intermediate transport zone between said toner loading station and said toner discharge station said top and bottom lobe members forming seals with said foam roll.

13. The toner dispensing apparatus of claim 12 including means to rotate said foam roll whereby sequential portions of its surface move through the toner loading station to receive toner in the expanded depressions, the intermediate transport zone, and the discharge station to discharge toner from the expanded depressions.

* * * * *